US009371873B2

(12) United States Patent
Piech et al.

(10) Patent No.: US 9,371,873 B2
(45) Date of Patent: Jun. 21, 2016

(54) PERMANENT MAGNET CENTERING SYSTEM FOR BRAKE

(75) Inventors: Zbigniew Piech, Cheshire, CT (US); Robert Wheeler, Bloomfield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 183 days.

(21) Appl. No.: 14/116,857

(22) PCT Filed: Jun. 16, 2011

(86) PCT No.: PCT/US2011/040632
§ 371 (c)(1),
(2), (4) Date: Nov. 11, 2013

(87) PCT Pub. No.: WO2012/173625
PCT Pub. Date: Dec. 20, 2012

(65) Prior Publication Data
US 2014/0090931 A1    Apr. 3, 2014

(51) Int. Cl.
| | | |
|---|---|---|
| *B66B 11/04* | (2006.01) | |
| *F16D 55/22* | (2006.01) | |
| *F16D 65/00* | (2006.01) | |
| *B66D 5/14* | (2006.01) | |
| *B66D 5/30* | (2006.01) | |
| *F16D 65/12* | (2006.01) | |
| *F16D 129/06* | (2012.01) | |

(52) U.S. Cl.
CPC .............. *F16D 65/005* (2013.01); *B66B 11/04* (2013.01); *B66D 5/14* (2013.01); *B66D 5/30* (2013.01); *F16D 55/22* (2013.01); *F16D 65/12* (2013.01); *F16D 2129/065* (2013.01)

(58) Field of Classification Search
CPC ............ B66B 11/04; B66D 5/14; B66D 5/30; F16D 71/00; F16D 2121/18; F16D 2129/00; F16D 2066/003
See application file for complete search history.

(56) References Cited

U.S. PATENT DOCUMENTS

| | | | |
|---|---|---|---|
| 5,014,828 A |   | 5/1991 | Baldassarre |
| 5,121,018 A | * | 6/1992 | Oldakowski .................... 310/77 |
| 5,197,571 A |   | 3/1993 | Burrell et al. |
| 5,467,850 A |   | 11/1995 | Skalski |
| 5,791,442 A |   | 8/1998 | Arnold |

(Continued)

FOREIGN PATENT DOCUMENTS

| | | |
|---|---|---|
| EP | 1544148 A1 | 6/2005 |
| EP | 1557392 A1 | 7/2005 |

(Continued)

OTHER PUBLICATIONS

International Search Report and Written Opinion for related International Application No. PCT/US11/40632; report dated Dec. 29, 2011.

(Continued)

*Primary Examiner* — William E Dondero
*Assistant Examiner* — Diem Tran
(74) *Attorney, Agent, or Firm* — Cantor Colburn LLP (57) ABSTRACT

A brake assembly for an elevator traction machine is disclosed. The brake assembly may include a rotating element, a fixed element mounted in operational association with the rotating element and a positioning device connected to the fixed element. The positioning device may additionally magnetically interface with the rotating element to facilitate centering of the fixed element relative to the rotating element.

15 Claims, 7 Drawing Sheets

(56) References Cited

U.S. PATENT DOCUMENTS

| | | |
|---|---|---|
| 6,119,818 A | 9/2000 | Krumbeck et al. |
| 6,260,673 B1 | 7/2001 | Mustalahti |
| 6,267,205 B1 | 7/2001 | Piech et al. |
| 7,591,351 B2 | 9/2009 | Fischer |
| 8,151,950 B2 * | 4/2012 | Fargo .......................... 188/164 |
| 2002/0100646 A1 * | 8/2002 | Maurice et al. ............... 188/161 |
| 2009/0194370 A1 | 8/2009 | Fargo et al. |
| 2010/0252379 A1 | 10/2010 | Piech et al. |

FOREIGN PATENT DOCUMENTS

| | | | |
|---|---|---|---|
| JP | 11-049460 | 2/1999 | |
| JP | 2002003095 A * | 1/2002 | ................ B66B 1/32 |
| JP | 2003-005890 | 1/2003 | |
| JP | 2007-070077 | 3/2007 | |
| JP | 2008039107 A | 2/2008 | |
| JP | 2008530967 A | 8/2008 | |
| JP | 2010-117111 | 5/2010 | |
| JP | 2011506225 A | 3/2011 | |
| WO | WO-2005/050051 A1 | 6/2005 | |
| WO | WO 2009/075669 A1 * | 6/2009 | |

OTHER PUBLICATIONS

Japanese Office Action, Application No. 2014-15795 with a mailing date of Mar. 17, 2015.

Korean Office Action, Application No. 10-2014-7001049 dated on Apr. 9, 2015.

* cited by examiner

PERMANENT MAGNET CENTERING SYSTEM FOR BRAKE

CROSS-REFERENCE TO RELATED APPLICATIONS

This application is a U.S. national stage filing under 35 U.S.C. §371 of International Patent Application No. PCT/US11/40632, filed on Jun. 16, 2011.

FIELD OF THE DISCLOSURE

The present disclosure generally relates to brake systems and, more particularly, relates to centering of a caliper relative to a rotor in a disc brake system.

BACKGROUND OF THE DISCLOSURE

Disc brakes are widely used for slowing or stopping rotation of an object in motion. One application of a disc brake is an elevator system and, particularly, a traction-based elevator system. Such elevator systems generally include an elevator car connected to a counterweight through hoisting ropes trained around a traction sheave. The traction sheave is driven by a motor such that rotation of the traction sheave moves the hoisting rope, thereby causing desired movement of the elevator car. To slow or halt the motion of the elevator car (e.g., by actuating a brake), the traction sheave is connected to a disc brake.

The traction sheave can be coupled on each side with a flange that acts as a rotating disc or rotor of the disc brake. The traction sheave and the rotors rotate together to facilitate movement of the elevator car. When friction is applied against both sides of the rotors, the rotors, as well as the traction sheave slow down or halt, thereby slowing or halting the movement of the elevator car. Friction to the rotors is applied by a caliper having at least one set of brake pads, brake coils and springs on each caliper. When the brake is actuated, the brake coils are disengaged and the springs apply a force to the brake pads, which contact the rotors, creating tangential friction forces opposing the motion of the rotors and the traction sheave.

The caliper is mounted such that it is fixed in tangential and radial directions, but allowed to have some degree of translation, or float, in an axial direction relative to the rotors. Although this amount of float is necessary to allow correct braking operation under a range of axial motion and loads that are encountered in service, such float is nevertheless also responsible for off-centering the caliper relative to the rotors. Centering of the caliper and the rotors helps prevent the brake pads from contacting the rotors when the brake is released. Ideally, the caliper will be centered over the rotors at all times by itself with a uniform gap between each brake pad and the rotor braking surfaces of the rotors. However, this typically is not the case. Accordingly, several techniques have been proposed in the past to particularly center the caliper and to ensure that the brake pads do not contact the rotors when the brake is released.

Although effective, such traditional techniques nonetheless have several disadvantages. For example, in most traditional techniques, mechanical devices, such as, sensors are employed to center the caliper and the rotors. These sensors maintain substantial physical contact with the rotors, resulting in stictional and frictional losses. Often such techniques also require a power supply or other closed-loop system to operate, not only adding to the overall cost and maintenance of the disc brake, but also being prone to malfunction and shorter life spans. Additionally, such sensors may not accommodate differential thermal expansion between a mounting unit for the sensors and the rotors.

Accordingly, it would be beneficial if a reliable, robust and/or inexpensive system were developed to facilitate centering of the caliper relative to the rotors. It would additionally or alternatively be beneficial if such a system would minimize stiction and friction losses, accommodate any thermal expansions and/or eliminate the need for a separate power supply system.

SUMMARY OF THE DISCLOSURE

In accordance with one aspect of the present disclosure, a brake assembly is disclosed. The brake assembly may include a rotating element, a fixed element mounted in operational association with the rotating element and a positioning device connected to the fixed element. The positioning device may additionally magnetically interface with the rotating element to facilitate centering of the fixed element relative to the rotating element.

In some refinements, the rotating element may be a rotor, the fixed element may be a caliper assembly and the positioning device may optionally include two side portions and a permanent magnet. The permanent magnet may also be optionally sandwiched between the two side portions, which in turn may be made of a ferromagnetic material.

In other refinements, each of the two side portions may optionally have a first interfacing surface and the rotating element may have a second interfacing surface such that the first and the second interfacing surfaces may interface with one another to magnetically interface the positioning device with the rotating element.

In additional refinements, the first interfacing surface may optionally have a first plurality of teeth with a first plurality of tips and the second interfacing surface may have a second plurality of teeth with a second plurality of tips. The first plurality of teeth may optionally magnetically interface with the second plurality of teeth and the first plurality of tips may be aligned with the facing second plurality of tips when the fixed element is centered with the rotating element and the first plurality of tips may optionally be offset from the facing second plurality of tips when the fixed element is off-centered from the rotating element.

In yet other refinements, the positioning device may optionally generate a magnetic flux that is concentrated at the first and the second plurality of tips.

In further refinements, the second interfacing surface may be machined within an annular groove of the rotating element and the annular groove may optionally include a non-magnetic stop.

In accordance with another aspect of the present disclosure, a machine for an elevator system is disclosed. The machine may include a traction sheave and an electric motor driving the traction sheave. The machine may additionally include a brake assembly for braking the traction sheave, the brake assembly having a caliper assembly and a positioning device having a permanent magnet, the positioning device connected to the caliper assembly and magnetically interfacing with the traction sheave.

In some refinements, the positioning device may optionally be positioned in between the caliper assembly and a rotor of the traction sheave. The positioning device may additionally optionally include a first plurality of teeth having a first plurality of tips, and the rotor may include a second plurality of teeth having a second plurality of tips, the first and the second plurality of tips may be aligned with one another to center the caliper assembly and the rotor.

In other refinements, the positioning device may optionally generate a magnetic flux that may be concentrated at the first and the second plurality of tips to align the first and the second plurality of tips.

In yet other refinements, the positioning device may optionally have a first interfacing surface that interfaces with a second interfacing surface of the traction sheave.

In accordance with yet another aspect of the present disclosure, a method of centering a fixed element and a rotating element is disclosed. The method may include providing a brake assembly having a rotating element, a fixed element connected in operational association with the rotating element, and a positioning device connected to the fixed element and magnetically interfacing with the rotating element. The method may additionally include generating a magnetic flux by the positioning device and routing the magnetic flux through the rotating element to restore a centered position of the fixed element and the rotating element. The method may further include repeating the generating step after each braking operation.

In some refinements, generating a magnetic flux may optionally include defining a closed-loop magnetic flux path from the positioning device to the rotating element and back.

In other refinements, defining a magnetic flux path may optionally include limiting a lateral movement of the magnetic flux into the rotating element.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the exemplary embodiments illustrated in greater detail on the accompanying drawings, wherein.

While the following detailed description has been given and will be provided with respect to certain specific exemplary embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims eventually appended hereto, and their equivalents.

DETAILED DESCRIPTION OF THE DISCLOSURE

Figure 1:
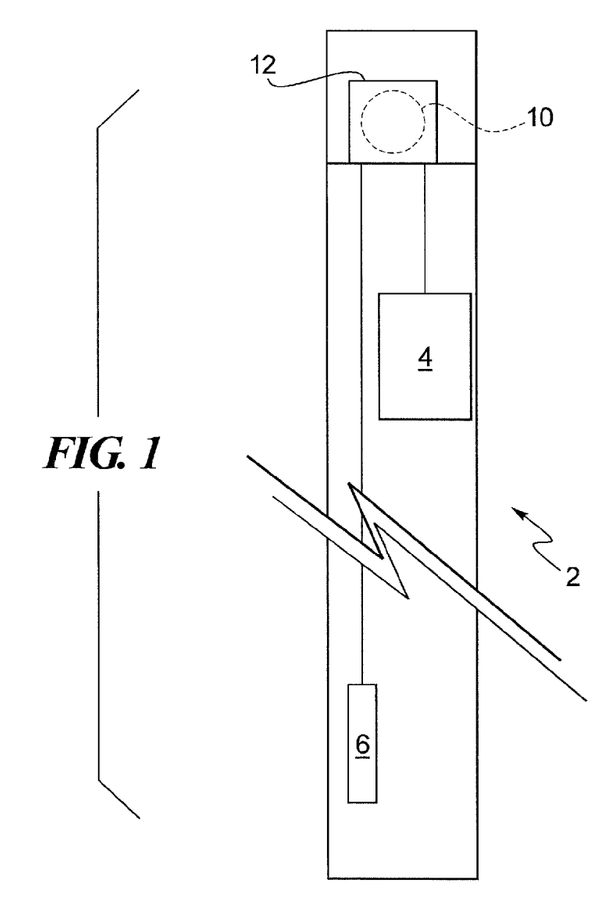
FIG. 1 is a simplified schematic representation of an elevator system employing a machine with a disc brake system of the present disclosure.

Referring now to FIG. 1, a simplified schematic representation of an elevator system 2 is shown, in accordance with at least some embodiments of the present disclosure. While all of the components of the elevator system 2 have not been shown and/or described in detail herein, a typical elevator system may include an elevator car 4 connected to a counterweight 6 via hoisting ropes (not shown). The hoisting ropes may extend over a traction sheave 10 driven by an electric motor within the traction sheave (e.g., the traction sheave 10 may be the rotor of the electric motor) to move or halt the elevator car 4 as desired. A disc brake system (described below) on the traction sheave 10 helps slow or halt the elevator system 2. The electric motor, the traction sheave 10 and the disc brake system are collectively referred to herein as an elevator traction machine 12. The elevator system 2, with the counterweight 6, operates in a known manner and is therefore, not described in detail for conciseness of expression. It will be understood, however, that components other than those described above, such as, elevator car frame, guide assembly, drive assembly etc., are contemplated and considered within the scope of the present disclosure.

Figure 2:
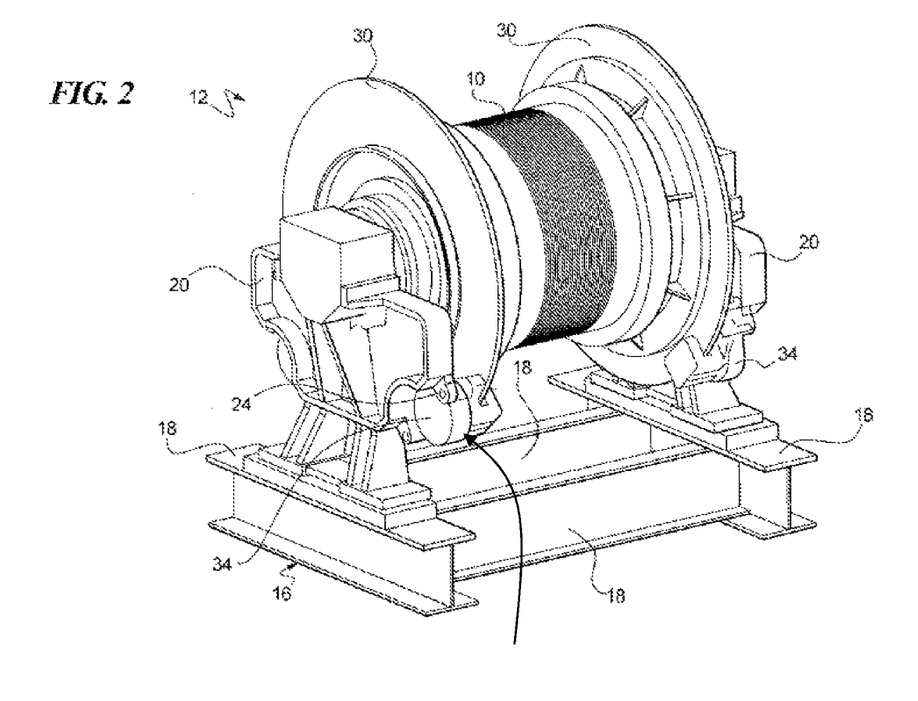
FIG. 2 is a perspective view of the machine with the disc brake system of FIG. 1 in greater detail.

Turning now to FIG. 2, an exemplary embodiment of the elevator traction machine 12 is shown in greater detail, in accordance with the present disclosure. As shown, the elevator traction machine 12 may include various structural members to assist with, for example, positioning or mounting the elevator traction machine in a machine room above the hoistway (e.g., the hoisting ropes). The structural members may, for example, include a bed plate 16 having a plurality of struts (e.g., steel struts or channels) 18. The structural members may additionally, include a pair of machine stands 20 mounted to and extending from the bed plate 16.

Furthermore, each of the machine stands 20 may be identical (or substantially identical) to one another in shape, size and form. The elevator traction machine 12 may also include a shaft (with mounted stator of the electric motor on it) extending between the two machine stands 20 and through the traction sheave 10. The machine stands 20 may, thus, be employed for fixing ends of the shaft for carrying the weight of the stator and of any rotating parts. Other components, such as, encoders, that are commonly employed in combination or conjunction with such machine stands and/or disc brake systems, although not shown and/or described, are nevertheless contemplated and considered within the scope of the present disclosure.

Flanges mounted on either side of the traction sheave 10 act as rotating elements or rotors 30 of the brake assembly 22. The brake assembly 22 may also include one or more fixed elements or caliper assemblies 34, one or more of which may be mounted to one of the respective machine stands 20 by way of suitable fasteners, such as, pins 24 and may additionally abut one of the respective rotors 30. Although not visible in FIG. 2, the brake assembly 22 may further include a positioning device 36 (See FIG. 3) for centering each of the caliper assemblies 34 relative to each of the respective rotors 30. The positioning device 36 is described in greater detail in FIGS. 3-7 below.

In operation, the brake assembly 22 may be electrically actuated. When the brake (not shown) of the elevator system 2 is energized (in a known manner), brake coils (not visible) positioned within the caliper assemblies 34 create a magnetic field, thereby moving brake pads (also not visible and positioned within the caliper assemblies) away from the rotors 30, and allowing rotation thereof for moving the traction sheave 10 (by the electric motor) to move the elevator car 4. When de-energized, the brake coils within the caliper assemblies 34 no longer affect the brake pads, and springs within the caliper assemblies move the brake pads towards and into contact with the rotors 30 in order to stop their rotation and to halt the motion of the elevator car 4.

Furthermore, during operation of the brake assembly 22, some or all of the caliper assemblies 34 may be fixed to the machine stands 20 in tangential and radial directions, but may have some degree of translation, or float, in an axial direction, as described below. The axial float, for example, helps accommodate dimensional changes in the elevator traction machine 12 due to temperature, etc. As an example, all of the caliper assemblies 34 on one end of the elevator traction machine 12 could allow axial float. This axial float of the caliper assemblies 34 is shown by an arrow 37 in FIG. 3. In order to account for the float and to ensure that the caliper assemblies 34 is returned to a centered position relative to the respective rotors 30 subsequent to the braking operation, the positioning device 36, described below, may be employed.

Figure 3:
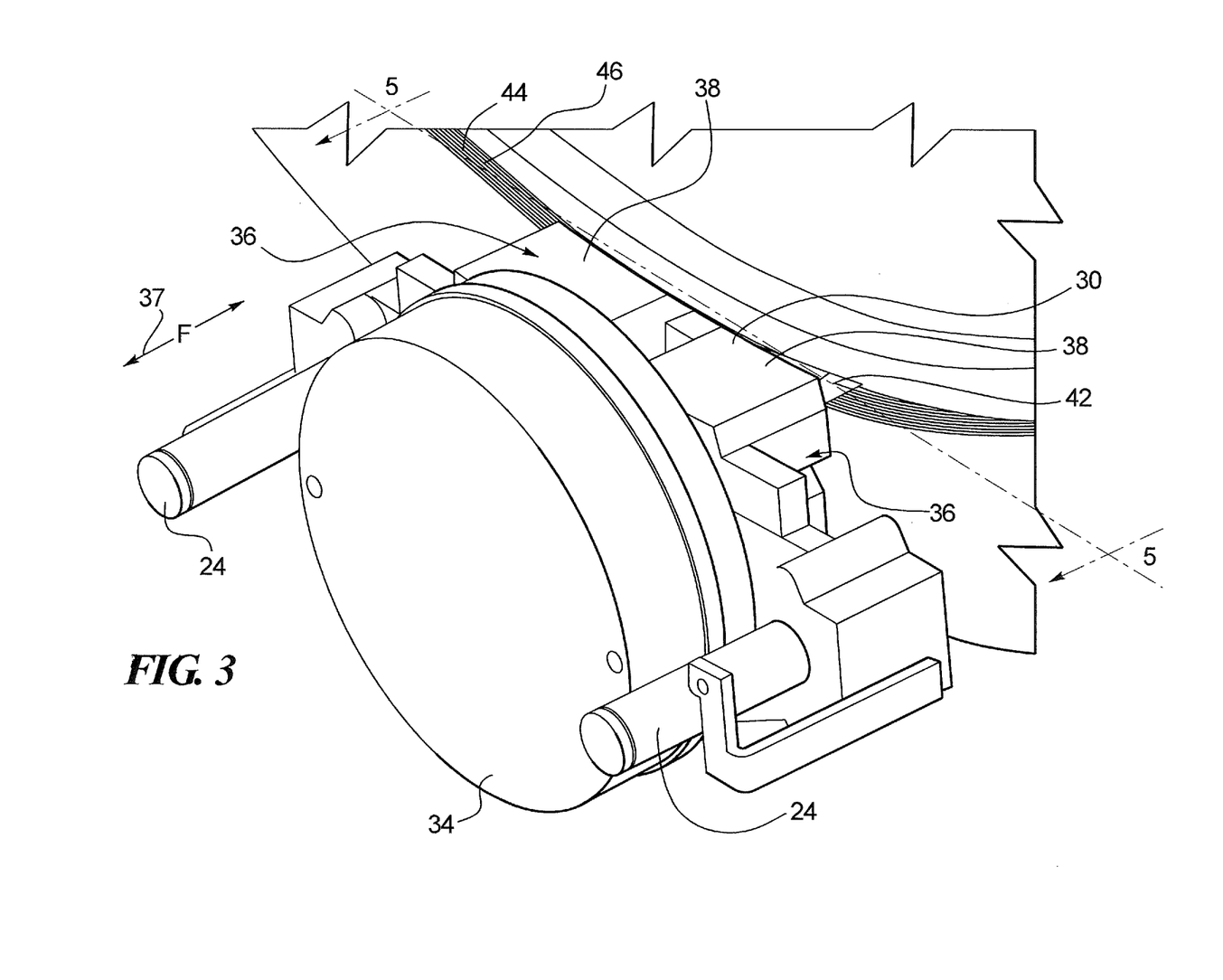
FIG. 3 is an enlarged perspective view of a portion of the disc brake system of FIG. 2 in greater detail.
Figure 4:
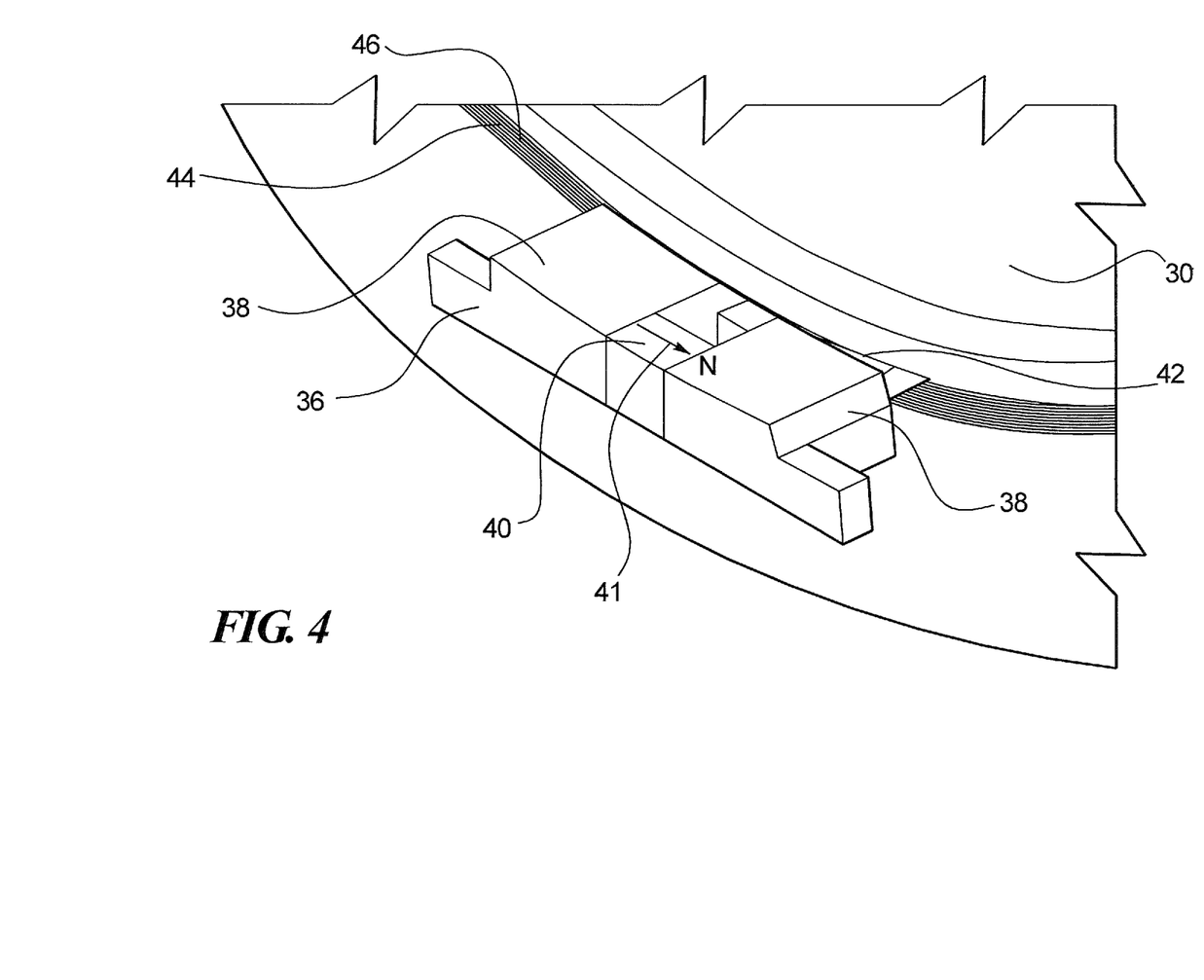
FIG. 4 is an enlarged perspective view of the disc brake system of FIG. 3 with a caliper assembly of the disc brake system removed.

Referring now to FIGS. 3-4, the positioning device 36 is shown and described in greater detail. Specifically, FIG. 3 shows a portion of the brake assembly 22 in greater detail with the positioning device positioned between one of the caliper assemblies 34 and one of the rotors 30, while FIG. 4 shows a portion of the brake assembly with the one of the caliper assemblies removed. For simplicity of explanation, the positioning device 36 is described below with respect to only one of the caliper assemblies 34 (also referred henceforth to as simply the caliper assembly 34) and one of the rotors 30 (also referred henceforth to as simply the rotor 30). However, it will be understood that the same teachings are applicable to other caliper assemblies 34 and other rotors 30 within the elevator traction machine 12, each of those caliper assemblies 34 and the rotors 30 having the positioning device 36 positioned therebetween.

The positioning device 36 may particularly be a magnetic positioning device and, more particularly, be a passive permanent magnetic device that is connected to the caliper assembly (the fixed element) 34 and that interfaces magnetically with the rotor (the rotating element) 30. In at least some embodiments, the positioning device 36 may be connected (or mounted) to the caliper assembly 34 mechanically by way of fasteners, such as, nuts, bolts, screws etc., or by adhesives and glues. In other embodiments, the positioning device 36 may be mounted to the caliper assembly 34 magnetically, or by other types of mechanisms as well. The connection (magnetic interface) between the positioning device 36 and the rotor 30 is described in greater detail below. By virtue of connecting the positioning device 36 between the caliper assembly 34 and the rotor 30 and, magnetically interfacing the positioning device with the rotor, the caliper assembly may be centered over the rotor with a uniform gap (e.g., positioned equidistant) between each brake pad and rotor braking surface of the rotor to ensure that the brake pad does not contact the rotor (e.g., the rotor braking surface) when the brake is released (e.g., energized).

To facilitate centering of the caliper assembly 34 and the rotor 30, the positioning device 36 may include side portions 38 that sandwich a permanent magnet 40 (See FIG. 4). In at least some embodiments, each of the side portions 38 may be made of a ferromagnetic material, such as, steel, although in other embodiments, other types of ferromagnetic material may be employed. Relatedly, to magnetically interface with the permanent magnet 40, the rotor 30 may be constructed of a ferromagnetic material, such as, cast iron (e.g., gray cast iron), although other types of ferromagnetic material commonly employed for constructing disc brake rotors may be employed.

By virtue of constructing the side portions 38, as well as the rotor 30 of a ferromagnetic material, a magnetic flux path (described in FIG. 6 below) from the permanent magnet 40 through the side portions 38 and the rotor 30 may be established for centering the rotor and the caliper assembly 34. Furthermore, in order to establish the magnetic flux path, the permanent magnet 40 may be positioned in a certain orientation or direction. For example, in at least some embodiments and, as shown, the permanent magnet 40 may be oriented such that a North Pole of the permanent magnet faces a direction shown by arrow 41 and the magnetic flux flows from the North Pole to the South Pole of the permanent magnet. In other embodiments, the North Pole may face a direction opposing the direction of arrow 41 and the magnetic flux may then flow in a direction opposite the direction described below in FIG. 6.

Notwithstanding the fact that in the embodiments of FIGS. 3 and 4, each of the side portions 38 has been shown as being similar (or substantially similar) in shape and size with the permanent magnet 40 being positioned centrally (or substantially centrally) between the side portions, this need not always be the case. Rather, in other embodiments, each of the side portions 38 may assume a configuration (e.g., shape and size) different from one another and/or the permanent magnet 40 may be positioned off-center between two asymmetric side portions. Furthermore, although only one of the permanent magnet 40 has been shown, it will be understood that in other embodiments, multiple of those permanent magnets and/or multiple positioning devices, each with one or more permanent magnets may be employed between the caliper assembly 34 and the rotor 30.

The shape, size and material of the permanent magnet 40 and the positioning of the positioning device 36 between the caliper assembly 34 and the rotor 30 may vary in other embodiments as well. Specifically, the shape, size and arrangement of the positioning device 36 may vary depending upon several factors, such as, the size of the elevator traction machine 12, the size and weight of the caliper assembly 34 and an axial force (F) required to center the caliper assembly and the rotor. The above parameters may also vary as long as the permanent magnet 40 is arranged to produce a magnetic flux (as described below) through the positioning device 36 and through the rotor 30 such that any changes in the relative position of the caliper assembly 34 and the rotor are sensed by the positioning device and magnetic shear forces (e.g., restoring axial forces) act to restore the brake assembly 22 to its centered position.

Figure 5:
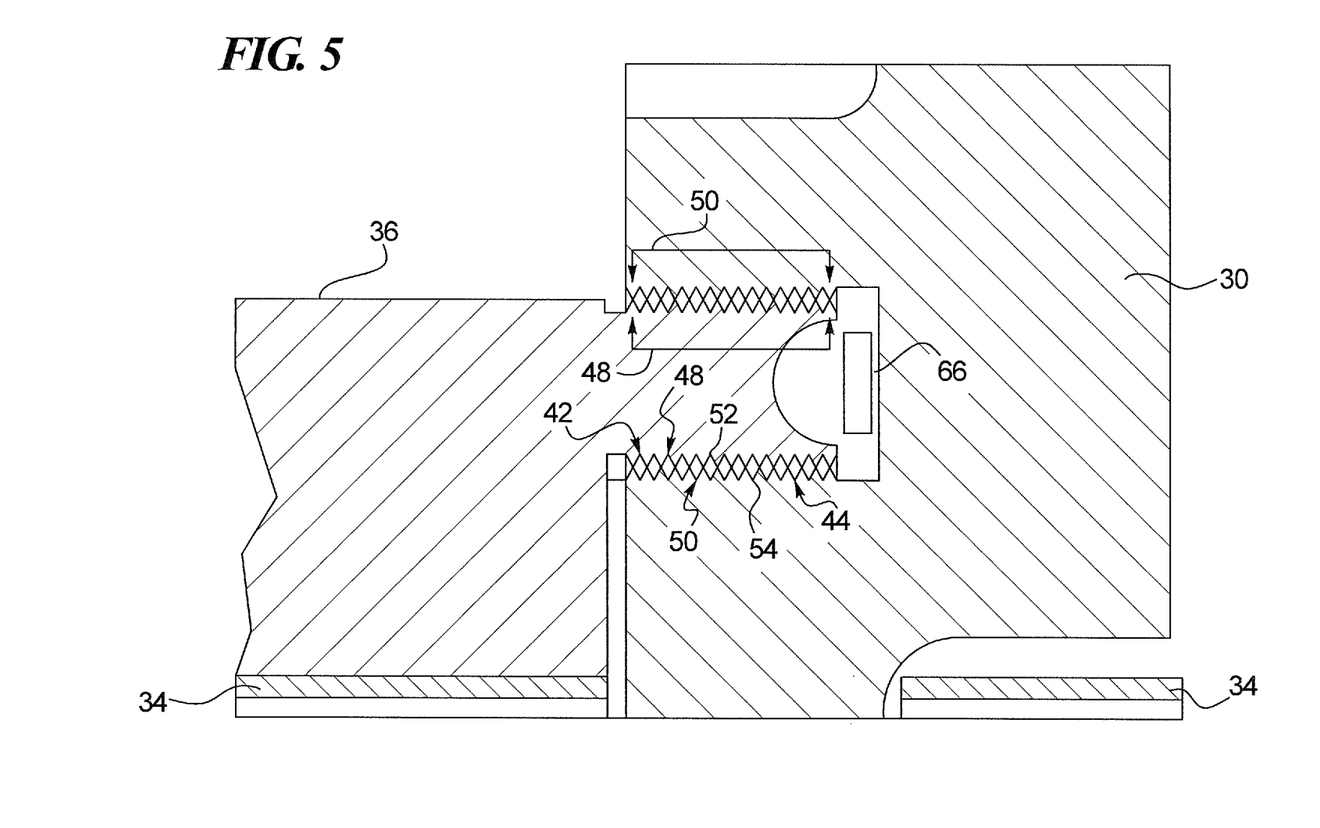
FIG. 5 is a cross-sectional view of the disc brake system taken along line 5-5 of FIG. 3.
Figure 6:
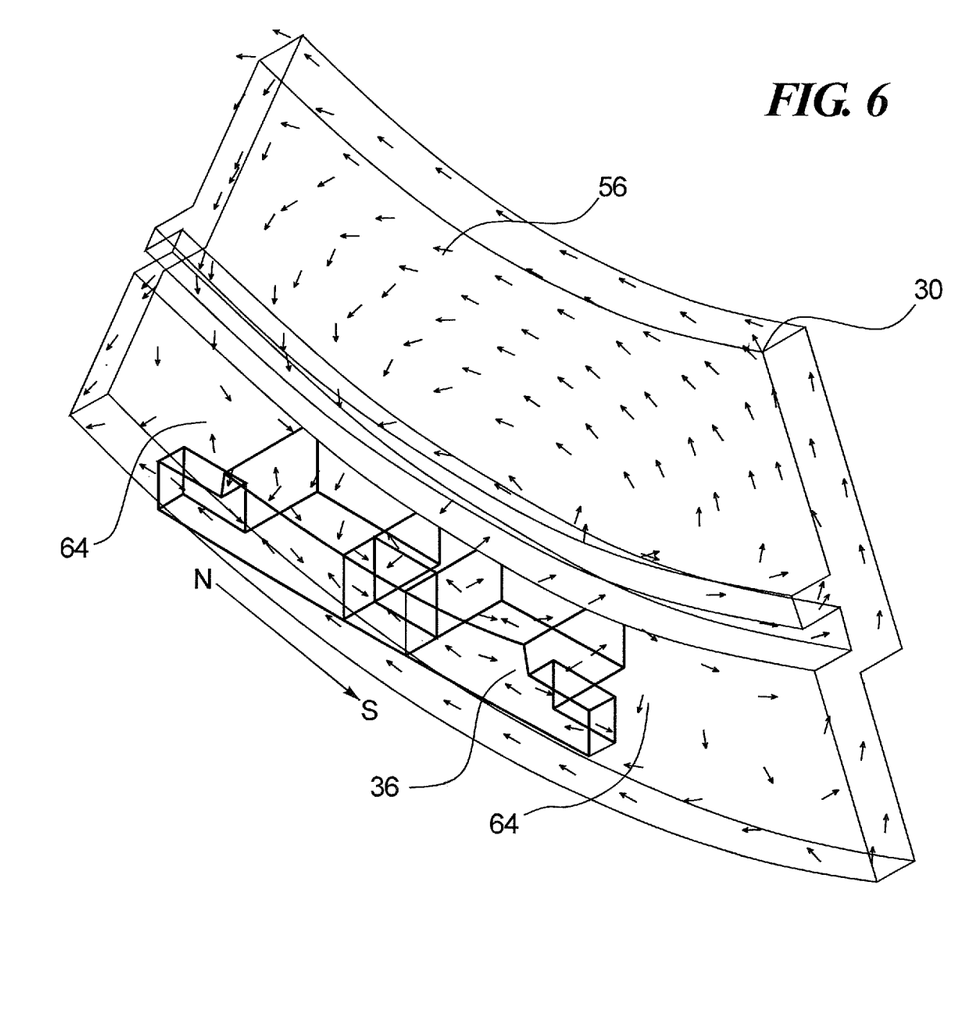
FIG. 6 shows a magnetic flux path through a magnetic device employed within the disc brake system of FIGS. 2-5.

Referring now to FIGS. 5 and 6 in conjunction with FIGS. 3 and 4, the positioning device 36 may be connected to magnetically interface the rotor 30 by way of first and second interfacing surfaces 42 and 44, respectively. The first interfacing surface 42 may be machined on each of the side portions 38, while the second interfacing surface 44 may be machined within an annular groove 46 of the rotor 30. Furthermore, each of the first and the second interfacing surfaces 42 and 44, respectively, may be machined with a plurality of respective teeth 48 and 50 having tips 52 and 54, respectively, with a small clearance between those tips.

To magnetically interface the positioning device 36 with the rotor 30, the side portions 38 may be inserted within the annular groove 46 such that the teeth 48 on the first interfacing surface 42 interface with the teeth 50 on the second interfacing surface 44. Particularly, the magnetic interface between the first and the second interfacing surfaces 42 and 44, respectively, is established such that the tips 52 of the teeth 48 align (e.g., directly touch or mate) with the tips 54 of the teeth 50. By virtue of magnetically interfacing the positioning device 36 with the rotor 30, any substantial direct physical contact between the positioning device and the rotor is avoided, thereby minimizing stictional and frictional losses. Furthermore, although in the present embodiment, a single positioning device 36 magnetically interfacing the rotor 30 through the annular groove 46 has been disclosed, in at least some embodiments, multiple annular grooves, each having a positioning device may be employed.

The aligned position of the tips 52 and 54 represents a centered position of the caliper assembly 34 and the rotor 30. Any deviation (due to the axial movement of the caliper assembly in the direction of the arrow 37) from the alignment of the tips 52 and 54 results in an off-centered position of the caliper assembly 34 and the rotor 30. This off-centered position may be corrected by the positioning device 36 and, particularly, the permanent magnet 40 of the positioning device, which produces a magnetic flux to restore the alignment between the tips 52 and 54, thereby returning the caliper assembly 34 and the rotor 30 in a centered position, in a manner described below.

With respect to the teeth 48 and 50 in particular, each of those pairs of teeth may be matching teeth that may be manufactured from a ferromagnetic material (such as steel) and may assume a trapezoidal or triangular configuration with the tips 52 and 54, respectively, and may or may not have chamfered end portions. Preferably, the number of teeth 48 on the first interfacing surface 42 may be equal to the number of teeth 50 on the second interfacing surface 44, although this need not always be the case. Furthermore, in at least some exemplary embodiments, fifteen of the teeth 48 and 50 on each of the first and the second interfacing surfaces 42 and 44, respectively, may be employed. In other embodiments, the number of teeth may vary. Similarly, in some exemplary embodiments, a tooth-to-tooth pitch (e.g., the distance two consecutive tips) of 1.67 millimeters for each of the teeth 48 and 50 may be employed. In other embodiments, the tooth-to-tooth pitch of the teeth 48 and 50 may vary.

Figure 7A:
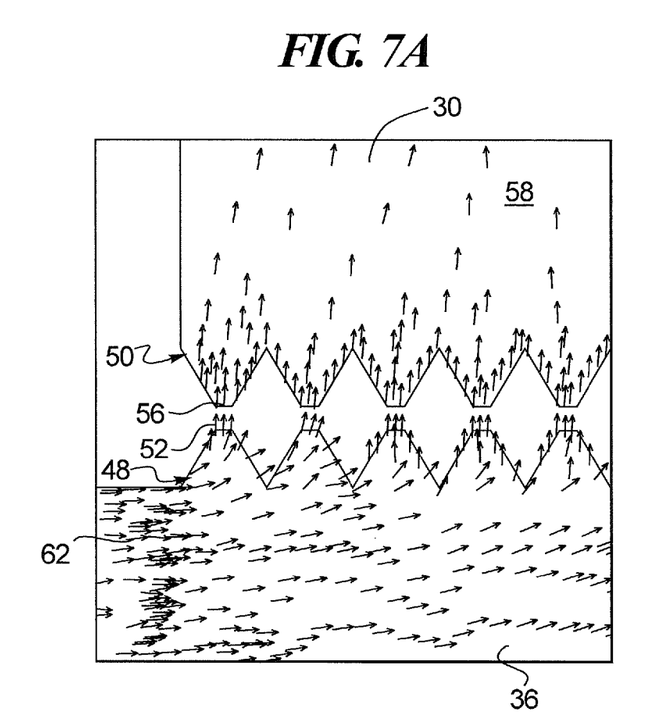
FIGS. 7A and 7B are magnetic flux density vector plots of the magnetic device of FIG. 6.
Figure 7B:
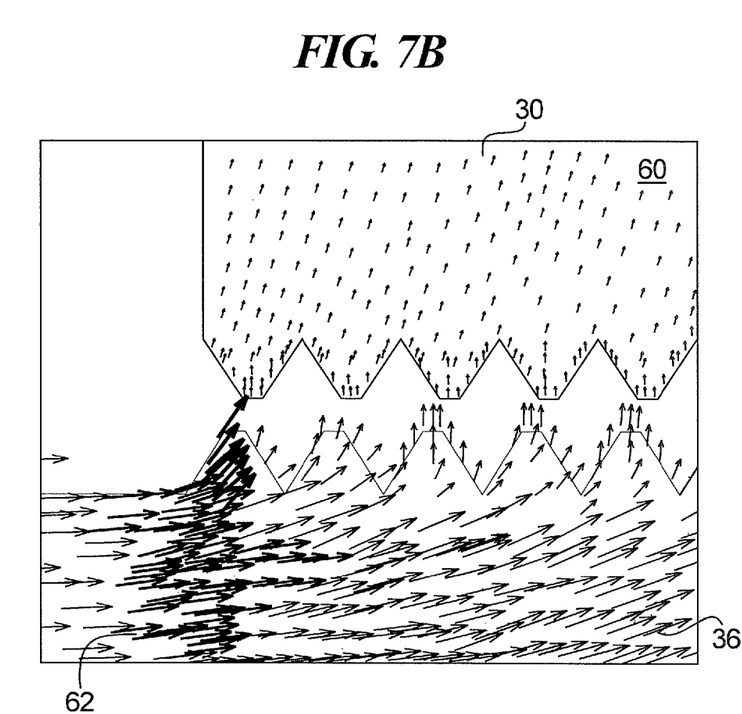

Referring now to FIGS. 6 and 7A-B, a magnetic flux path 56 of the permanent magnet 40 is illustrated in FIG. 6, while magnetic flux density vector plots 58 and 60 of a magnetic flux 62 are shown in FIGS. 7A and 7B, respectively. As described above, the positioning device 36 with the permanent magnet 40 and the rotor 30 are set up such that the tips 52 and 54 of the teeth 48 and 50, respectively, are in an aligned position corresponding to a centered position of the caliper assembly 34 and the rotor 30. During operation, as axial forces (F), also shown by the arrow 37 in FIG. 3, act on either the caliper assembly 34 or the rotor 30 and off-center those components, the magnetic flux (e.g., magnetic field) 62 (shown by the plurality of arrows in FIGS. 7A and 7B) produced by the permanent magnet 40 generates a restoring axial force (e.g., in the direction opposite to the axial force F) to restore alignment between the tips 52 and 54 and return the caliper assembly and the rotor in a stable centered position. As will be described further below, the magnetic flux 62 tends to follow the magnetic flux path 56 to maintain a position of minimal reluctance and any increase in the reluctance is countered with a restoring axial force to return the magnetic flux to the minimal reluctance position.

With respect to the magnetic flux path 56 corresponding to the magnetic flux 62 produced by the permanent magnet 40, it extends in the direction of the arrow 41 (from the North Pole to the South Pole) and follows a closed loop through the side portions 38 of the positioning device 36 into the rotor 30 and back to the permanent magnet through the other of the side portions. Furthermore, the magnetic flux path 56 strives to take a shortest path from the positioning device 36 to the rotor 30 and back. The shortest distance and minimal reluctance for the magnetic flux 62 and the magnetic flux path 56 is obtained when the tips 52 of the teeth 48 are directly aligned with the tips 54 of the facing teeth 50. Therefore, the magnetic flux 62 flows from each of the tips 52 of the teeth 48 of the positioning device 36 to each of the corresponding tips 54 of the teeth 50 of the rotor 30, as shown by loop portions 64 of the magnetic flux path 56 in FIG. 6. The magnetic flux 62 is thus concentrated between the tips 52 and 54 of the facing or corresponding pair of teeth 48 and 50.

Such an aligned (or centered) position of the tips 52 and 54 corresponds to a centered position of the caliper assembly 34 and the rotor 30. This position is shown in the plot 58, where the corresponding tips 52 and 54 are aligned with one another and have an offset of zero (0) millimeters. If the tips 54 of the teeth 50 of the rotor 30 are laterally moved away (e.g., offset due to the axial movement of the caliper assembly 34) from the tips 52 of the teeth 48 of the positioning device 36, resulting in an off-centered position of the caliper assembly 34 and the rotor 30, the reluctance in the magnetic flux 62 increases. In order to restore the minimal reluctance position of the tips 52 and 54, the magnetic flux 62 produces an opposing axial restoring force and forces the offset tips 54 back to the aligned position with the tips 52. The plot 60 shows an offset of a quarter (0.25) millimeters for the tips 52 and 54 of the teeth 48 and 50, respectively, and the restoring force generated by the permanent magnet 40.

Thus, the magnetic flux 62 tends to maintain a position of minimum reluctance at all times and any increase in the reluctance (due to offset of the tips 52 and 54) causes the permanent magnet 40 to attempt and minimize the reluctance and maintain the tips 52 and 54 in alignment, thereby maintaining a centered position of the caliper assembly 34 and the rotor 30. Furthermore, to prevent direct contact between the positioning device 36 and the rotor 30, a non-magnetic stop 66 is located within the annular groove 46 of the rotor and in the path of the magnetic flux path 56. The stop 66 and internal semi-circular shape of the positioning device 36 create the non-magnetic barrier preventing the magnetic flux 62 from flowing to the disc with omission of the teeth 48 and 50.

INDUSTRIAL APPLICABILITY

In general, the present disclosure sets forth a brake assembly connected in operational association with a traction sheave. The brake assembly may include rotating elements or rotors, fixed elements or caliper assemblies and positioning devices positioned in between each of the respective caliper assemblies and the rotors. Each of the positioning devices may include a permanent magnet that is arranged to produce a magnetic flux through each of the rotors to center each of the respective caliper assemblies therewith.

By virtue of centering the caliper assemblies and the rotors through use of a permanent magnet (in the form of a positioning device described above), the present disclosure provides several advantages over traditional centering mechanisms. For example, there is no substantial physical contact between the sensor (the positioning device) and the part whose position is sensed (the rotors), thereby eliminating or at least substantially reducing any frictional losses. Furthermore, the positioning device provides a passive control, thereby eliminating the need for a power supply and closed-loop control system of traditional schemes. Additionally, the positioning device overcomes the typical problems of mechanical centering devices which involve stiction (static friction) and friction and provides the ability to accommodate differential thermal expansion between reference (sensor mounting) and the sensed part (the rotors). Thus, the positioning device provides for a brake assembly and therefore, a disc brake system that is robust, easier to maintain and use, enjoys a long lifespan with minimal maintenance and is inexpensive to install and operate.

Furthermore, notwithstanding the fact that the above disclosure has been described with respect to an elevator system, it will be understood that the disc brake system may be employed with other types of machines and systems that employ disc brakes as well.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A brake assembly, comprising:
   a rotating element;
   a fixed element mounted in operational association with the rotating element; and
   a positioning device connected to the fixed element and magnetically interfacing with the rotating element to facilitate centering of the fixed element relative to the rotating element;
   wherein the positioning device includes a first interfacing surface having a first plurality of teeth with a first plurality of tips and the rotating element includes a second interfacing surface having a second plurality of teeth with a second plurality of tips, the first interfacing surface and the second interfacing surface interfacing with one another to magnetically interface the positioning device with the rotating element.

2. The brake assembly of claim 1, wherein the rotating element is a rotor and the fixed element is a caliper assembly.

3. The brake assembly of claim 1, wherein the positioning device includes two side portions and a permanent magnet sandwiched between the two side portions.

4. The brake assembly of claim 3, wherein each of the two side portions is made of a ferromagnetic material.

5. The brake assembly of claim 3, wherein each of the two side portions has the first interfacing surface and the rotating element has the second interfacing surface.

6. The brake assembly of claim 5, wherein the second interfacing surface is machined within an annular groove of the rotating element.

7. The brake assembly of claim 6, wherein the annular groove further comprises a non-magnetic stop.

8. The brake assembly of claim 1, wherein the first plurality of teeth magnetically interfaces with the second plurality of teeth.

9. The brake assembly of claim 1, wherein the first plurality of tips is aligned with the second plurality of tips when the fixed element is centered with the rotating element.

10. The brake assembly of claim 1, wherein the first plurality of tips is offset from the second plurality of tips when the fixed element off-centered from the rotating element.

11. The brake assembly of claim 1, wherein the positioning device generates a magnetic flux that is concentrated at the first plurality of tips and the second plurality of tips.

12. A machine for an elevator system, comprising:
    a traction sheave having a rotor;
    an electric motor driving the traction sheave; and
    a brake assembly for braking the traction sheave, the brake assembly having a caliper assembly and a positioning device having a permanent magnet, the positioning device connected to the caliper assembly and magnetically interfacing with the traction sheave;
    wherein the positioning device has a first plurality of teeth having a first plurality of tips, and the rotor has a second plurality of teeth having a second plurality of tips, the first plurality of tips and the second plurality of tips being aligned with one another to center the caliper assembly and the rotor.

13. The machine of claim 12, wherein the positioning device is positioned in between the caliper assembly and the rotor of the traction sheave.

14. The machine of claim 12, wherein the positioning device generates a magnetic flux that is concentrated at the first plurality of tips and the second plurality of tips to align the first and the second plurality of tips.

15. The machine of claim 12, wherein the positioning device has a first interfacing surface that interfaces with a second interfacing surface of the traction sheave.

* * * * *